US012062315B2

(12) United States Patent
Lei

(10) Patent No.: US 12,062,315 B2
(45) Date of Patent: Aug. 13, 2024

(54) DISPLAY DEVICE DRIVING METHOD AND DISPLAY DEVICE FOR CORRECTING COMMON VOLTAGE OF GRAYSCALES

(71) Applicants: Huizhou China Star Optoelectronics Display Co., Ltd., Guangdong (CN); TCL China Star Optoelectronics Technology Co., Ltd., Guangdong (CN)

(72) Inventor: Yong Lei, Guangdong (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/622,885

(22) PCT Filed: Dec. 20, 2021

(86) PCT No.: PCT/CN2021/139499

§ 371 (c)(1),
(2) Date: Dec. 27, 2021

(87) PCT Pub. No.: WO2023/103066

PCT Pub. Date: Jun. 15, 2023

(65) Prior Publication Data

US 2024/0038122 A1 Feb. 1, 2024

(30) Foreign Application Priority Data

Dec. 10, 2021 (CN) ......................... 202111508967.7

(51) Int. Cl.
*G09G 3/20* (2006.01)

(52) U.S. Cl.
CPC ... *G09G 3/2007* (2013.01); *G09G 2320/0247* (2013.01)

(58) Field of Classification Search
CPC ..................... G09G 3/2007; G09G 2320/0247
See application file for complete search history.

(56) References Cited

U.S. PATENT DOCUMENTS

2018/0108287 A1* 4/2018 Jiang ................... G09G 3/3614

FOREIGN PATENT DOCUMENTS

CN 101127195 2/2008
CN 101739978 6/2010
(Continued)

OTHER PUBLICATIONS

International Search Report and the Written Opinion Dated Jun. 27, 2022 From the International Searching Authority Re. Application No. PCT/CN2021/139499 and its translation into English. (17 Pages).

(Continued)

*Primary Examiner* — Lisa S Landis

(57) ABSTRACT

The present application provides a display device driving method and a display device. In the display device driving method, when optimal common voltages of other grayscales are determined using an optimal common voltage of a standard grayscale, and when grayscale shift occurs in the other grayscales, the optimal common voltages of the other grayscales are corrected, so that correct common voltages can be adopted when the display device is driven, and problems such as screen flicker caused by the grayscale shift in the display device are prevented.

18 Claims, 2 Drawing Sheets

(56) References Cited

FOREIGN PATENT DOCUMENTS

| | | |
|---|---|---|
| CN | 103810963 | 5/2014 |
| CN | 105118457 | 12/2015 |
| CN | 105989808 | 10/2016 |
| CN | 107272237 | 10/2017 |
| CN | 108877717 | 11/2018 |
| CN | 109036255 | 12/2018 |
| CN | 109509458 | 3/2019 |
| CN | 110033728 | 7/2019 |
| KR | 10-2016-0038954 | 4/2016 |

OTHER PUBLICATIONS

Notification of Office Action and Search Report Dated May 13, 2023 From the State Intellectual Property Office of the People's Republic of China Re. Application No. 202111508967.7 and Its Translation Into English. (25 Pages).

* cited by examiner

DISPLAY DEVICE DRIVING METHOD AND DISPLAY DEVICE FOR CORRECTING COMMON VOLTAGE OF GRAYSCALES

RELATED APPLICATIONS

This application is a National Phase of PCT Patent Application No. PCT/CN2021/139499 having International filing date of Dec. 20, 2021, which claims the benefit of priority of Chinese Patent Application No. 202111508967.7 filed on Dec. 10, 2021. The contents of the above applications are all incorporated by reference as if fully set forth herein in their entirety.

FIELD AND BACKGROUND OF DISCLOSURE THE INVENTION

Field of Disclosure

The present disclosure relates to a field of display technology, and more particularly to a display device driving method and a display device.

Description of Prior Art

In a driving process of a conventional display device, a driving circuit and a driving voltage are designed in order to reduce or eliminate color deviation problems in different viewing angles. Specifically, 3T (i.e., three thin film transistors) is used to share a potential of an electrode drain auxiliary sub-pixel so that the auxiliary sub-pixel has different brightness at different grayscales, thereby improving color deviation. In this process, a common voltage (CF COM) of each grayscale is determined using a best common voltage of a high grayscale. However, when the common voltage of each grayscale is determined using the best common voltage of the high grayscale, in order to prevent grayscale crosstalk, the best common voltage of the low grayscale is shifted, and screen flashes and mura deteriorates in the low grayscale, so that a yield of the display device is reduced and a display effect is reduced.

Therefore, the conventional display device has a technical problem that determining the common voltage of each grayscale using an optimal common voltage of a high grayscale may cause the common voltage of each grayscale to be shifted.

SUMMARY OF DISCLOSURE THE INVENTION

Embodiments of the present disclosure provide a display device driving method and a display device for alleviating a technical problem that a common voltage of each grayscale may be shifted due to determining a common voltage of each grayscale using an optimal common voltage of a high grayscale in a conventional display device.

In order to solve the above problems, the present disclosure provides technical solutions as follows:

The present disclosure provides a display device driving method, comprising:

obtaining an optimal common voltage of a standard grayscale of the display device;

determining optimal common voltages of other grayscales based on the optimal common voltage of the standard grayscale;

determining whether the other grayscales are shift based on the optimal common voltages of the other grayscales and a standard value corresponding to each grayscale; and correcting the optimal common voltages of the other grayscales when the other grayscales are shifted, and driving the display device using the corrected optimal common voltages.

In the embodiment of the present disclosure, when the optimal common voltage of the standard grayscale is used to determine the optimal common voltages of the other grayscales, when the grayscale shift occurs in the other grayscales, the optimal common voltages of the other grayscales are corrected. Therefore, when the display device is driven, the correct common voltages can be used, and problems such as screen flicker caused by the grayscale shift of the display device can be prevented.

In some embodiments, before the step of determining whether the other grayscales are shift based on the optimal common voltages of the other grayscales and the standard value corresponding to each grayscale, the display device driving method further comprises:

obtaining an actual forward driving voltage and an actual reverse driving voltage for each grayscale; and determining the standard value corresponding to each grayscale based on the actual forward driving voltage and the actual reverse driving voltage of each grayscale.

In the embodiment of the present disclosure, by obtaining the actual forward driving voltage and the reverse driving voltage, the actual standard value of each grayscale can be determined, so that the actual standard value and the standard value determined by the standard grayscale can be used to determine whether there is a grayscale shift. Therefore, corresponding processing is performed when the grayscale shift occurs, so as to prevent problems such as screen flickering of the display device.

In some embodiments, the step of determining whether the other grayscales are shift according to the optimal common voltages of the other grayscales and the standard value corresponding to each grayscale comprises:

comparing the optimal common voltages of the other grayscales with the standard value corresponding to each grayscale, and determining a difference between the optimal common voltage of each grayscale and the standard value corresponding to each grayscale; and determining whether or not there is grayscale shift in the other grayscales based on the difference between the optimal common voltage of each grayscale and the standard value corresponding to each grayscale and a preset value.

The embodiment of the present disclosure considers that there will be a certain voltage drop problem in the display process of the display device, so that the standard value has a certain error range. Within the error range, it means that there is no grayscale shift, so as to accurately determine the display device whether the grayscale shift has occurred, the grayscale of the display device is corrected when the grayscale shift occurs.

In some embodiments, the step of determining whether the other grayscales are shift according to the optimal common voltages of the other grayscales and the standard value corresponding to each grayscale comprises:

obtaining a maximum forward driving voltage of the standard grayscale;

determining the maximum forward driving voltages of the other grayscales according to the maximum forward driving voltage of the standard grayscale, the optimal common voltage of the standard grayscale, and the optimal common voltages of the other grayscales, and determining the maximum forward driving voltages of the other grayscales as the standard value corresponding to each grayscale; and determining whether the other grayscales have grayscale shift based on the standard value corresponding to the other grayscales and the actual forward driving voltage of the other grayscales.

In the embodiment of the present disclosure, the theoretical forward driving voltages of the other grayscales are determined by the maximum forward driving voltage of the standard grayscale and the standard value, and then the theoretical forward driving voltage and the actual forward driving voltage can be used to determine whether a grayscale shift has occurred. Shift without judging by the intermediate value of each grayscale, which improves the efficiency of data processing. In some embodiments, the step of determining whether the other grayscales have grayscale shift according to the optimal common voltages of the other grayscales and the standard value corresponding to each grayscale comprises:

obtaining a maximum reverse driving voltage of the standard grayscale;

determining maximum reverse driving voltages of the other grayscales according to the maximum reverse driving voltage of the standard grayscale, the optimal common voltage of the standard grayscale, and the optimal common voltages of the other grayscales, and determining the maximum reverse driving voltages of the other grayscales as the standard value corresponding to each grayscale; and determining whether the other grayscales are shift based on the standard values corresponding to the other grayscales and the actual reverse driving voltages of the other grayscales.

In the embodiment of the present disclosure, the theoretical reverse driving voltages of the other grayscales are determined by the maximum reverse driving voltage of the standard grayscale and the standard value, and then the theoretical reverse driving voltage and the actual reverse driving voltage can be used to determine whether a grayscale shift has occurred. Shift without judging by the intermediate value of each grayscale, which improves the efficiency of data processing.

In some embodiments, the step of correcting the optimal common voltages of the other grayscales and driving the display device using the corrected optimal common voltages when the other grayscales have grayscale shift comprises:

determining critical grayscales of the other grayscales when there is grayscale shift;

correcting optimal common voltages of the critical grayscales, and correcting optimal common voltages of non-critical grayscales among other grayscales using the optimal common voltages after critical grayscale correction; and driving the display device using the corrected optimal common voltages.

In the embodiment of the present disclosure, the optimal common voltages of the critical grayscales in the display device is corrected, and the other non-critical grayscales are corrected by the critical grayscales, the non-critical grayscales can be corrected by the critical grayscales, and the optimal common voltages of the other grayscales can be corrected accurately.

In some embodiments, the step of correcting the optimal common voltages of the critical grayscales and correcting the optimal common voltages of the non-critical grayscales among the other grayscales using the optimal common voltages after the critical grayscale correction comprises:

obtaining actual forward driving voltages and actual reverse driving voltages of the critical grayscales;

determining actual optimal common voltages of the critical grayscales according to the actual forward driving voltages and the actual reverse driving voltages of the critical grayscales; and correcting the optimal common voltages of the critical grayscales according to the actual optimal common voltages of the critical grayscales, and correcting the optimal common voltages of the non-critical grayscales among the other grayscales using the optimal common voltages after the critical grayscale correction.

In the embodiment of the present disclosure, the intermediate value of the critical grayscale is determined by the actual forward driving voltage and the actual reverse driving voltage of the critical grayscale, so that the optimal common voltage of the critical grayscale can be accurately corrected, and accordingly, the optical common voltage of the non-critical grayscale can be accurately determined.

In some embodiments, the step of correcting the optimal common voltages of the critical grayscales and correcting the optimal common voltages of the non-critical grayscales among the other grayscales using the optimal common voltages after the critical grayscale correction comprises:

correcting optimal common voltages of the critical grayscales, and determining the optimal common voltages after the critical grayscale correction; and determining critical grayscales closest to the non-critical grayscales, and correcting the optimal common voltages of the non-critical grayscales using the optimal common voltage corrected for the closest critical grayscales.

In the embodiment of the present disclosure, the optimal common voltage of the non-critical grayscale is corrected by using the closest critical grayscale, so that the optimal common voltage of the non-critical grayscale is more accurate and the amount of data processing is reduced.

In some embodiments, the step of correcting the optimal common voltages of the other grayscales and driving the display device using the corrected optimal common voltages when the other grayscales have grayscale shift comprises:

determining an actual forward driving voltage and an actual reverse driving voltage of each grayscale when there is a grayscale shift for the other grayscales;

determining an actual optimal common voltage of each grayscale according to the actual forward driving voltage and the actual reverse driving voltage of each grayscale; and correcting the optimal common voltage of each grayscale according to the actual optimal common voltage of each grayscale, and driving the display device using the corrected optimal common voltage.

In the embodiment of the present disclosure, the actual forward driving voltage and the actual reverse driving voltage of each grayscale are used to correct the grayscale shifted by the grayscale, so that the optimal common voltage of each grayscale shifted can use the accurate optimal common voltage to eliminate screen flicker and other issues caused by grayscale shift.

In some embodiments, the step of correcting the optimal common voltages of the other grayscales and driving the display device using the corrected optimal common voltage when the other grayscales have a grayscale shift further comprises:

determining a gamma voltage corresponding to each grayscale when correcting the optimal common voltages of the other grayscales; and correcting the gamma voltage of each voltage when the gamma voltage corresponding to each grayscale is different from a preset gamma voltage.

At the same time, the present disclosure further provides a display device, comprising:

an obtaining module configured to obtain an optimal common voltage of a standard grayscale of the display device;

a determining module configured to determine optimal common voltages of other grayscales according to the optimal common voltage of the standard grayscale;

a judging module configured to determine whether the other grayscales are shift according to the optimal common voltages of the other grayscales and a standard value corresponding to each grayscale; and a driving module configured to correct the optimal common voltages of the other grayscales when the other grayscales have grayscale shift, and drive the display device using the corrected optimal common voltages.

In some embodiments, the display device further comprises a standard module configured to obtain an actual forward driving voltage and an actual reverse driving voltage of each grayscale, and determine the standard value corresponding to each grayscale based on the actual forward driving voltage and the actual reverse driving voltage of each grayscale.

In some embodiments, the judging module is specifically configured to determine a difference between an optimal common voltage of each grayscale and the standard value corresponding to each grayscale by comparing the optimal common voltages of the other grayscales with the standard value corresponding to each grayscale; whether or not there is a grayscale shift in the other grayscales is determined based on the difference between the optimal common voltage of each grayscale and the standard value corresponding to each grayscale and a preset value.

In some embodiments, the judging module is specifically configured to obtain a maximum forward driving voltage of the standard grayscale, determine maximum forward driving voltages of the other grayscales according to the maximum forward driving voltage of the standard grayscale, the optimal common voltage of the standard grayscale, and the optimal common voltages of the other grayscales, determine the maximum forward driving voltages of the other grayscales as the standard value corresponding to each grayscale, and determine whether the other grayscales have a grayscale shift based on the standard values corresponding to the other grayscales and the actual forward driving voltage of the other grayscales.

In some embodiments, the judging module is specifically configured to obtain a maximum reverse driving voltage of the standard grayscale, determine maximum reverse driving voltages of the other grayscales according to the maximum reverse driving voltage of the standard grayscale, the optimal common voltage of the standard grayscale, and the optimal common voltages of the other grayscales, determine the maximum reverse driving voltages of the other grayscales as the standard value corresponding to each grayscale, and determine whether the other grayscales are shift based on the standard values corresponding to the other grayscales and the actual reverse driving voltages of the other grayscales.

In some embodiments, the driving module is specifically configured to determine critical grayscales among the other grayscales when there is a grayscale shift, correct optimal common voltages of the critical grayscales, and correct optimal common voltages of non-critical grayscales among the other grayscales using the optimal common voltages after the critical grayscale correction, and drive the display device using the corrected optimal common voltages.

In some embodiments, the driving module is specifically configured to obtain actual forward driving voltages and actual reverse driving voltages of the critical grayscales, determine actual optimal common voltages of the critical grayscales according to the actual forward driving voltages and the actual reverse driving voltages of the critical grayscales; correct the optimal common voltages of the critical grayscales according to the actual optimal common voltages of the critical grayscales, and correct the optimal common voltages of the non-critical grayscales among the other grayscales using the optimal common voltages of the critical grayscale correction.

In some embodiments, the driving module is specifically configured to correct the optimal common voltages of the critical grayscales and determine the optimal common voltages after the critical grayscale correction, determine critical grayscales closest to the non-critical grayscales, and correct the optimal common voltages of the non-critical grayscales using the corrected optimal common voltages for the closest critical grayscales.

In some embodiments, the driving module is specifically configured to determine an actual forward driving voltage and an actual reverse driving voltage of each grayscale when there is a grayscale shift in the other grayscales, determine an actual optimal common voltage of each grayscale according to the actual forward driving voltage and the actual reverse driving voltage of each grayscale, correct the optimal common voltage of each grayscale according to the actual optimal common voltage of each grayscale, and drive the display device using the corrected optimal common voltage.

In some embodiments, the driving module is specifically configured to determine a gamma voltage corresponding to each grayscale when correcting the optimal common voltages of the other grayscales, and correct the gamma voltage of each grayscale when the gamma voltage corresponding to each grayscale is different from a preset gamma voltage.

The present disclosure provides a display device driving method and a display device. After obtaining the optimal common voltage of the standard grayscale of the display device, the driving method of the display device determines the optimal common voltages of the other grayscales according to the optimal common voltage of the standard grayscale, and then determines the optimal common voltages of the other grayscales according to the optimal common voltages of the other grayscales, determines whether there is grayscale shift in the other grayscales according to the optimal common voltages of the other grayscales and the corresponding standard value of each grayscale, and when there is grayscale shift in the other grayscales, the optimal common voltages of the other grayscales are corrected, and the display device is driven by the corrected optimal common voltage. In the present disclosure, when optimal common voltages of other grayscales are determined using an optimal common voltage of a standard grayscale, and when grayscale shift occurs in the other grayscales, the optimal common voltages of the other grayscales are corrected, so that correct common voltages can be adopted when the display device is driven, and problems such as screen flicker caused by the grayscale shift in the display device are prevented.

BRIEF DESCRIPTION OF THE SEVERAL VIEWS OF THE DRAWINGS

The technical solutions and other beneficial effects of the present disclosure will be apparent from the detailed description of the specific embodiments of the present disclosure with reference to the accompanying drawings.

DETAILED DESCRIPTION OF SPECIFIC EMBODIMENTS OF THE INVENTION

The following describes the technical solutions of the embodiments of the present disclosure clearly and completely with reference to the accompanying drawings in the embodiments of the present disclosure. It will be apparent that the described embodiments are only some but not all of the embodiments of the present disclosure. Based on the embodiments of the present disclosure, all other embodiments obtained by those skilled in the art without creative effort fall within the scope of the present disclosure.

Embodiments of the present disclosure provide a display device driving method and a display device for solving a technical problem that a common voltage of each grayscale is shifted due to determining a common voltage of each grayscale using an optimal common voltage of a high grayscale in a conventional display device.

Figure 1:
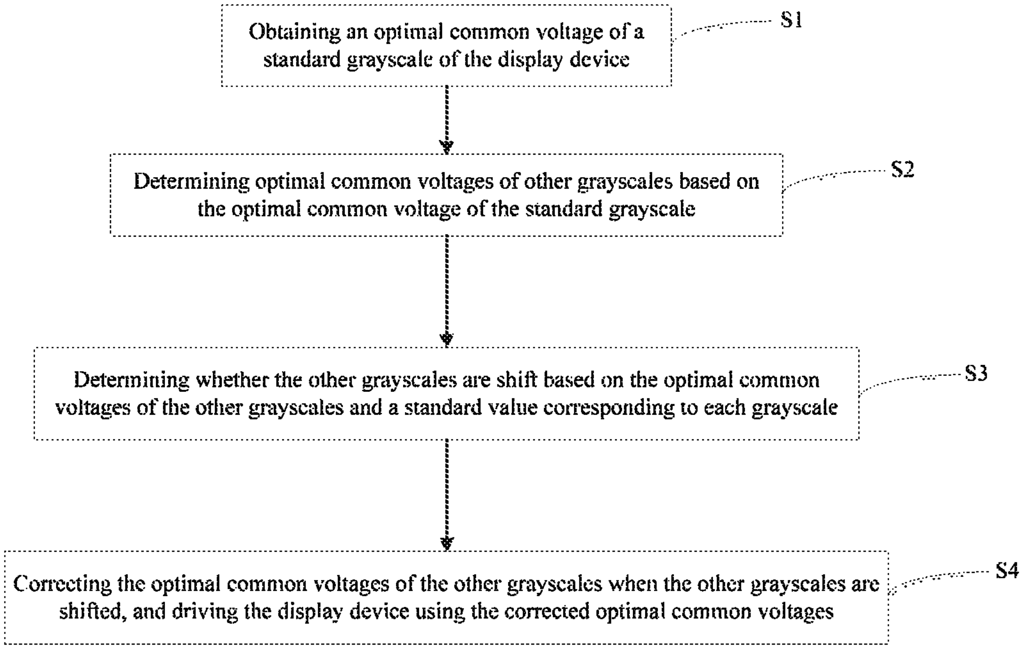
FIG. 1 is a flowchart of a display device driving method according to an embodiment of the present disclosure.

As shown in FIG. 1, an embodiment of the present disclosure provides a display device driving method, and the display device driving method comprises:

S1, obtaining an optimal common voltage of a standard grayscale of the display device;

S2 determining optimal common voltages of other grayscales based on the optimal common voltage of the standard grayscale;

S3, determining whether there is a grayscale shift in the other grayscales based on the optimal common voltages of the other grayscales and a standard value corresponding to each grayscale; and S4, when there is a grayscale shift in the other grayscales, the optimal common voltages of the other grayscales are corrected, and the corrected optimal common voltages drive the display device.

An embodiment of the present disclosure provides a display device driving method. When optimal common voltages of other grayscales are determined by using an optimal common voltage of a standard grayscale, when the grayscale shift occurs in the other grayscales, the optimal common voltages of the other grayscales are corrected, so that the correct common voltages can be adopted when the display device is driven, and problems such as screen flicker caused by grayscale shift in the display device are prevented.

It should be noted that the standard grayscale refers to a grayscale for determining a common voltage of each grayscale. For example, a voltage signal comprises 0 to 255, 256 grayscales in total. If an optimal common voltage of the 255th grayscale is used to determine common voltages of other grayscales, the 255th grayscale is the standard grayscale.

It should be noted that the optimal common voltage refers to the optimal CF com voltage whose value makes the CF com voltage at an intermediate value of forward and reverse frame voltages. For example, if the forward and reverse frame voltages are respectively forward 10V and reverse 10V, the optimal common voltage is 0V.

It should be noted that the grayscale shift refers to a state in which a theoretical intermediate value of the forward voltage and the reverse voltage of a certain grayscale of the display device is different from an actual intermediate value. For example, if a theoretical intermediate value of the 64th grayscale determined according to the 255th grayscale is 0.3 volts, but it is determined by measurement that an actual forward voltage of the 64th grayscale is 3V and an actual reverse voltage is −3V, the actual intermediate value is 0V, it is determined that the theoretical intermediate value of the 64th grayscale is different from the actual intermediate value, and it is determined that the grayscale shift occurs in the 64th grayscale.

In one embodiment, when optimal common voltages of the other grayscales are determined according to the optimal common voltage of the standard grayscale, the optimal common voltage of the standard grayscale can be directly determined as a common voltage of a low grayscale when an optimal common voltage of a high grayscale is currently used to determine the common voltages of the other grayscales, and the driving circuit of the display device is driven using the common voltage of each grayscale. Therefore, the optimal common voltage of the standard grayscale can be used as the optimal common voltage of the other grayscales, and then whether the grayscale shift occurs or not is determined and adaptively modified.

Figure 2:
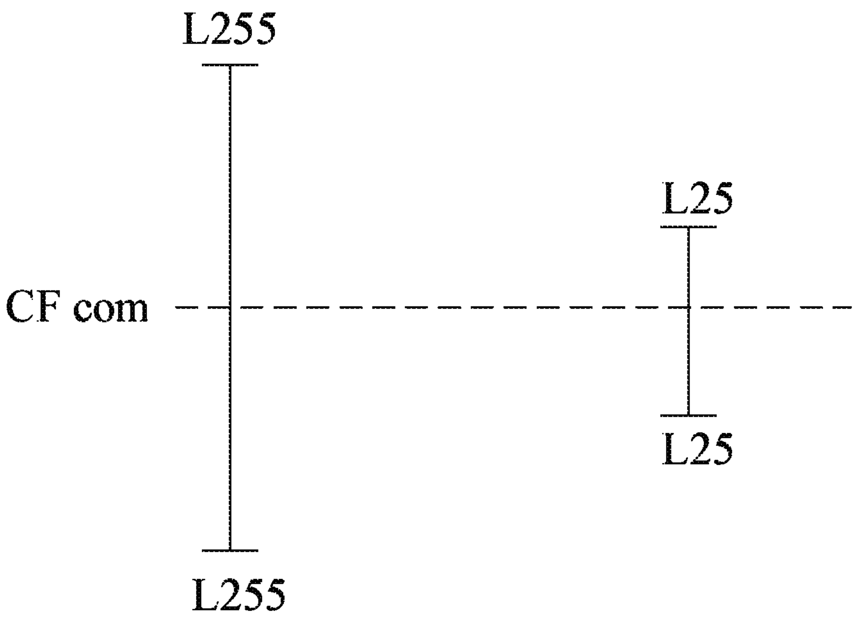
FIG. 2 is a schematic diagram of a current common voltage according to an embodiment of the present disclosure.

Specifically, as shown in FIG. 2, a 256-grayscale driving mode is used as an example. The CF com is determined according to the 255th grayscale L255. However, in an actual process, a voltage of a low grayscale is shifted. For example, an intermediate value of forward and reverse frame voltages of the 255th grayscale L255 is different from that of CF corn determined by the 255th grayscale L255.

In one embodiment, the standard value refers to an actual standard common voltage of each grayscale, that is, corresponding to each grayscale, the intermediate value determined by the actual forward and reverse frame voltages, for example, if the intermediate value of the actual forward and reverse frame voltages, is 1, the standard value is 1, and this value is not determined by the optimal common voltage of the standard grayscale.

In one embodiment, before the step of determining whether there is a grayscale shift in the other grayscales according to the optimal common voltages of the other grayscales and the standard value corresponding to each grayscale, the method further comprises:

Obtaining an actual forward driving voltage and an actual forward driving voltage for each grayscale;

The standard value corresponding to each grayscale is determined based on the actual forward driving voltage and the actual reverse driving voltage of each grayscale. According to the actual forward driving voltage and the actual reverse driving voltage of each grayscale, an actual intermediate value of each grayscale can be determined, and then the standard value corresponding to each grayscale can be determined through the actual intermediate value.

In one embodiment, the step of determining whether there is a grayscale shift in the other grayscales according to the optimal common voltages of the other grayscales and the standard value corresponding to each grayscale comprises:

Comparing the optimal common voltages of the other grayscales with the standard value corresponding to each grayscale, and determining a difference between the optimal common voltage of each grayscale and the standard value corresponding to each grayscale;

Determining whether or not there is a grayscale shift in the other grayscales based on the difference between the optimal common voltage of each grayscale and the standard value corresponding to each grayscale and a preset value. When determining the optimal common voltage of each grayscale and the standard value corresponding to each grayscale, considering that a certain error still exists in the driving voltage even if the driving voltage is compensated by the circuit or the driving method, it is possible to set the preset value such that when the difference between the optimal common voltage of each grayscale and the standard value corresponding to each grayscale is less than the preset value, it is determined that the grayscale is not shifted, and when the difference is greater than or equal to the preset value, it is indicated that the grayscale is shifted, and then the corresponding processing is performed.

In one embodiment, the standard value may also be the maximum forward driving voltage, and whether the grayscale shift problem occurs is determined by comparing the maximum forward driving voltage with the actual forward driving voltage.

In one embodiment, the step of determining whether there is a grayscale shift in the other grayscales according to the optimal common voltages of the other grayscales and the standard value corresponding to each grayscale includes:

Obtaining a maximum forward driving voltage of the standard grayscale;

Determining maximum forward driving voltages of the other grayscales according to the maximum forward driving voltage of the standard grayscale, the optimal common voltage of the standard grayscale, and the optimal common voltages of the other grayscales, and determining the maximum forward driving voltages of the other grayscales as the standard values corresponding to each grayscale;

Determining whether the other grayscales have a grayscale shift based on the standard values corresponding to the other grayscales and the actual forward driving voltages of the other grayscales. When the driving voltage of the display device is determined, the driving voltage of each grayscale is determined. Therefore, the maximum forward driving voltages of the other grayscales can be determined by the maximum forward driving voltage of the standard grayscale, the optimal common voltage of the standard grayscale, and the optimal common voltages of the other grayscales, and the maximum forward driving voltages of the other grayscales can be determined as the standard value corresponding to each grayscale, so that whether or not each grayscale has a grayscale shift can be determined based on the theoretical maximum forward driving voltage of each grayscale and the actual forward driving voltage.

Specifically, for example, if the optimal common voltage of the standard grayscale is used as the optimal common voltages of the other grayscales, the theoretical maximum forward driving voltage of each grayscale may be determined according to the grayscale difference between the standard grayscale and the other grayscales, the maximum forward driving voltage of the standard grayscale, and a ratio of the forward driving voltage of each grayscale, so that the maximum forward driving voltage and the actual forward driving voltage can be compared, and only the grayscale shift is determined.

The above-described embodiment is described in detail with respect to the determination of the grayscale shift by the forward driving voltage. However, this embodiment of the present disclosure is not limited thereto, and the grayscale shift may be determined by the reverse driving voltage. Specifically, the step of determining whether the other grayscales is shift according to the optimal common voltages of the other grayscales and the standard value corresponding to each grayscale includes:

Obtaining a maximum reverse driving voltage of the standard grayscale;

Determining maximum reverse driving voltages of the other grayscales according to the maximum reverse driving voltage of the standard grayscale, the optimal common voltage of the standard grayscale, and the optimal common voltages of the other grayscales, and determining the maximum reverse driving voltages of the other grayscales as the standard value corresponding to each grayscale;

Determining whether the other grayscales are shift based on the standard values corresponding to the other grayscales and the actual reverse driving voltages of the other grayscales. The theoretical reverse driving voltage of each grayscale is determined by the reverse driving voltage and the optimal common voltage, and whether a grayscale shift occurs is determined by the theoretical maximum forward driving voltage and the actual reverse driving voltage.

When the grayscale is shifted, a large shift is mainly generated in a part of the grayscale, or the shift of the part of the grayscale has a large effect on the display effect. In one embodiment, the step of correcting the optimal common voltages of the other grayscales when there is a grayscale shift and driving the display device using the corrected optimal common voltage comprises:

Determining critical grayscales of the other grayscales when there is a grayscale shift;

Correcting optimal common voltages of the critical grayscales, and correcting optimal common voltages of non-critical grayscales among the other grayscales using the optimal common voltages after the critical grayscale correction;

Driving the display device using the corrected optimal common voltages. By determining the critical grayscales in the grayscales when a grayscale shift occurs, and correcting the optimal common voltages of the critical grayscales, the optimal common voltages of the critical grayscales are accurate. At the same time, for the non-critical grayscales, the optimal common voltages can be corrected according to the optimal common voltages of the critical grayscales, so that the optimal common voltages of the critical grayscales and the non-critical grayscales can be corrected, and the display device is driven by the corrected optimal common voltages.

In one embodiment, the step of correcting the optimal common voltages of the critical grayscales and correcting the optimal common voltages of the non-critical grayscales among the other grayscales using the optimal common voltages after the critical grayscale correction includes:

Obtaining actual forward driving voltages and actual reverse driving voltages of the critical grayscales;

Determining actual optimal common voltages of the critical grayscales according to the actual forward driving voltages and the actual reverse driving voltages of the critical grayscales;

Correcting the optimal common voltages of the critical grayscales according to the actual optimal common voltages of the critical grayscales, and correcting the optimal common voltages of the non-critical grayscales among the other grayscales using the optimal common voltages after the critical grayscale correction. When correcting the critical grayscales, the actual forward driving voltages and the actual reverse driving voltages of the critical grayscales may be obtained, and intermediate values of the actual forward driving voltages and the actual reverse driving voltages may be determined accordingly. Then, the actual optimal common voltages of the critical grayscales may be determined according to the intermediate values, and the optimal common voltages of the critical grayscales may be corrected.

In correcting the optimal common voltages of the non-critical grayscales, it is considered that the shift difference between a critical grayscale and an adjacent non-critical grayscale is small. In one embodiment, the step of correcting the optimal common voltages of the critical grayscales and correcting the optimal common voltages of the non-critical grayscales among the other grayscales using the optimal common voltages after the critical grayscale correction includes:

Correcting the optimal common voltages of the critical grayscales, and determining the optimal common voltages after the critical grayscale correction;

Determining a critical grayscale closest to a non-critical grayscale, and correcting an optimal common voltage of the non-critical grayscale using an optimal common voltage corrected for the closest critical grayscale. The common voltage of the non-critical grayscale is corrected by using the critical grayscale closest to the non-critical grayscale, so that the optimal common voltage of the non-critical grayscale and the adjacent critical grayscale are similar or the same, thereby the common voltage of the non-critical grayscale is corrected.

Specifically, for example, the critical grayscales include the 25th grayscale, the 48th grayscale, the 64th grayscale, the 127th grayscale, the 223th grayscale, and the 255th grayscale. After correcting the optimal common voltages of the critical grayscales, when correcting the non-critical grayscales, the nearest critical grayscales may be searched for, thereby correcting the non-critical grayscales. For example, if the non-critical grayscale is the 30th grayscale, it may be determined that the closest critical grayscale is the grayscale, thereby correcting the optimal common voltage of the 30th grayscale according to the optimal common voltage after correcting the 25th grayscale. Specifically, the optimal common voltage after the 25th grayscale correction may be the optimal common voltage at the 30th grayscale.

In the above embodiment, the optimal common voltages for correcting the other grayscales is described in detail by taking the critical grayscale as an example. However, the embodiment of the present disclosure is not limited thereto. In one embodiment, the step of correcting the optimal common voltages of other grayscales and driving the display device using the corrected optimal common voltages when the other grayscales are shifted includes:

Determining an actual forward driving voltage and an actual reverse driving voltage for each grayscale when there is grayscale shift for the other grayscales;

Determining an actual optimal common voltage of each grayscale according to the actual forward driving voltage and the actual reverse driving voltage of each grayscale;

Correcting the optimal common voltage of each grayscale according to the actual optimal common voltage of each grayscale, and driving the display device using the corrected optimal common voltage. Correcting the optimal common voltage of each grayscale by determining the actual driving voltage of the grayscale or the actual driving voltage of each grayscale at which the shift occurs when the grayscale shift occurs, and determining the actual optimal common voltage of each grayscale by the actual driving voltage of each grayscale, and driving the display device using the corrected optimal common voltage.

When the optimal common voltage for each grayscale is adjusted, a gamma voltage may be shifted. In one embodiment, the step of correcting the optimal common voltages of the other grayscales and driving the display device using the corrected optimal common voltages when the other grayscales have a grayscale shift further comprises:

Determining a gamma voltage corresponding to each grayscale when correcting the optimal common voltages of the other grayscales;

When the gamma voltage corresponding to each grayscale is different from a preset gamma voltage, the gamma voltage of each grayscale is corrected. By determining the preset gamma voltage, for example 2.2, after correcting the optimal common voltage of each grayscale, the gamma voltage is corrected, for example 2.2, when the actual gamma voltage is different from the preset gamma voltage, thereby improving the display effect.

Specifically, in the driving process of the display device, the timing control board is used to detect a grayscale of a current screen, and when it is detected that a grayscale of the current screen is not a standard grayscale, the corrected optimal common voltage of each grayscale is called to drive the display device using the corrected optimal common voltage.

Figure 3:
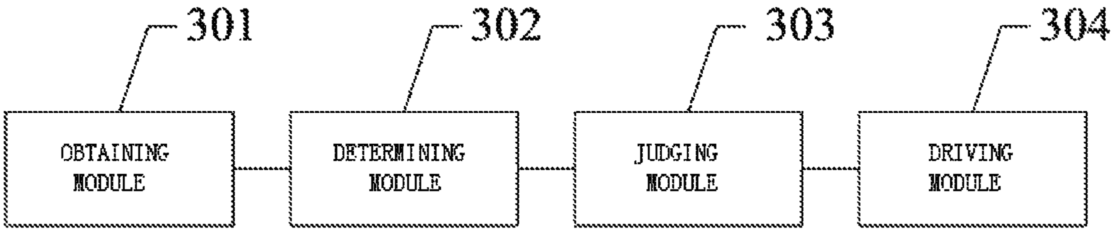
FIG. 3 is a structural diagram of a display device according to an embodiment of the present disclosure.

Meanwhile, as shown in FIG. 3, an embodiment of the present disclosure provides a display device, and the display device comprises:

An obtaining module 301 for obtaining an optimal common voltage of a standard grayscale of the display device;

A determining module 302 for determining optimal common voltages of other grayscales according to the optimal common voltage of the standard grayscale;

A judging module 303, configured to determine whether the other grayscales is shift according to the optimal common voltages of the other grayscales and the standard value corresponding to each grayscale;

A driving module 304 for correcting the optimal common voltages of the other grayscales when there is grayscale shift, and driving the display device using the corrected optimal common voltages.

An embodiment of the present disclosure provides a display device which, in a driving process, by determining the optimal common voltages of the other grayscales when the optimal common voltage of the standard grayscale is adopted, corrects the optimal common voltages of the other grayscales when the other grayscales are shifted, so that a correct common voltage can be adopted when the display device is driven, and a problem such as screen flicker caused by the grayscale shift of the display device is prevented.

In one embodiment, the display device further comprises a standard module for obtaining an actual forward driving voltage and an actual reverse driving voltage of each grayscale; and a standard value corresponding to each grayscale is determined based on the actual forward driving voltage and the actual reverse driving voltage of each grayscale.

In one embodiment, the judging module is specifically configured to determine a difference between the optimal common voltage of each grayscale and the standard value corresponding to each grayscale by comparing the optimal common voltages of the other grayscales with the standard value corresponding to each grayscale; determine whether or not there is a grayscale shift in the other grayscales based on the difference between the optimal common voltage of each grayscale and the standard value corresponding to each grayscale and a preset value.

In one embodiment, the judging module is specifically configured to obtain a maximum forward driving voltage of the standard grayscale; determine maximum forward driving voltages of the other grayscales according to the maximum forward driving voltage of the standard grayscale, the optimal common voltage of the standard grayscale, and the optimal common voltages of the other grayscales, and determine the maximum forward driving voltages of the other grayscale as a standard value corresponding to each grayscale; and determine whether the other grayscales have grayscale shift based on the standard values corresponding to the other grayscales and the actual forward driving voltages of the other grayscales.

In one embodiment, the judging module is specifically configured to obtain a maximum reverse driving voltage of the standard grayscale; determine maximum reverse driving voltages of the other grayscales according to the maximum reverse driving voltage of the standard grayscale, the optimal common voltage of the standard grayscale, and the optimal common voltages of the other grayscales, and determining the maximum reverse driving voltages of the other grayscales as the standard value corresponding to each grayscale; determine whether the other grayscales are shift based on the standard values corresponding to the other grayscales and the actual reverse driving voltages of the other grayscales.

In one embodiment, the driving module is specifically configured to determine critical grayscales of the other grayscales when there is a grayscale shift; correct optimal common voltages of the critical grayscales, and correct optimal common voltages of non-critical grayscales among the other grayscales using the optimal common voltages after the critical grayscale correction; and drive the display device using the corrected optimal common voltages.

In one embodiment, the driving module is specifically configured to obtain actual forward driving voltages and actual reverse driving voltages of the critical grayscales; determining actual optimal common voltages of the critical grayscales according to the actual forward driving voltages and the actual reverse driving voltages of the critical grayscales; correct the optimal common voltages of the critical grayscales according to the actual optimal common voltages of the critical grayscales, and correct optimal common voltages of non-critical grayscales among other grayscales using the optimal common voltages after the critical grayscale correction.

In one embodiment, the driving module is specifically configured to correct the optimal common voltages of the critical grayscales and determine the optimal common voltages after the critical grayscale correction; determine a critical grayscale closest to the non-critical grayscale, and correct the optimal common voltage of the non-critical grayscale using the optimal common voltage corrected for the closest critical grayscale.

In one embodiment, the driving module is specifically configured to determine an actual forward driving voltage and an actual reverse driving voltage of each grayscale when the other grayscales have grayscale shift; determine an actual optimal common voltage of each grayscale according to the actual forward driving voltage and the actual reverse driving voltage of each grayscale; correct the optimal common voltage of each grayscale according to the actual optimal common voltage of each grayscale, and drive the display device using the corrected optimal common voltage.

In one embodiment, the driving module is specifically configured to determine gamma voltages corresponding to the grayscales when correcting the optimal common voltages of the other grayscales; when the gamma voltage corresponding to each grayscale is different from a preset gamma voltage, the gamma voltage of each grayscale is corrected.

According to the above embodiment,

Embodiments of the present disclosure provide a display device driving method and a display device. The display device driving method determines the optimal common voltages of the other grayscales according to the optimal common voltage of the standard grayscale after obtaining the optimal common voltage of the standard grayscale of the display device, determines whether the other grayscales have the grayscale shift according to the optimal common voltages of the other grayscales and the standard value corresponding to each grayscale, corrects the optimal common voltages of the other grayscales when the other grayscales have the grayscale shift, and drives the display device using the corrected optimal common voltages. In the present disclosure, when the optimal common voltages of the other grayscales are determined by using the optimal common voltage of the standard grayscale, and when the grayscale shift occurs in the other grayscales, the optimal common voltages of the other grayscales are corrected, so that the correct common voltages can be adopted when driving the display device, and problems such as screen flicker caused by the grayscale shift in the display device are prevented.

In the above-described embodiments, the descriptions of the various embodiments are each focused, and portions of some embodiments that are not detailed may be referred to the related descriptions of other embodiments.

The display device driving method and the display device provided in the embodiments of the present disclosure are described in detail above. The principles and embodiments of the present disclosure are described in detail herein. The description of the embodiments is merely intended to help understand the technical solutions and core ideas of the present disclosure. Those of ordinary skill in the art will appreciate that they may still modify the technical solutions described in the foregoing embodiments, or equivalently replace some of the technical features therein. These modifications or substitutions do not deviate the nature of the respective solutions from the scope of the solutions of the embodiments of the present disclosure.

What is claimed is:

1. A display device driving method, comprising following steps:

obtaining an optimal common voltage of a standard grayscale of the display device;

determining optimal common voltages of other grayscales based on the optimal common voltage of the standard grayscale;

determining whether the other grayscales are shift based on the optimal common voltages of the other grayscales and a standard value corresponding to each grayscale; and correcting the optimal common voltages of the other grayscales when the other grayscales are shifted, and driving the display device using the corrected optimal common voltages, wherein the correction of the optimal common voltages of the other grayscales and driving the display device using the corrected optimal common voltages when the other grayscales have grayscale shift comprises:

determining an actual forward driving voltage and an actual reverse driving voltage of each grayscale when there is a grayscale shift for the other grayscales;

determining an actual optimal common voltage of each grayscale according to the actual forward driving voltage and the actual reverse driving voltage of each grayscale; and correcting the optimal common voltage of each grayscale according to the actual optimal common voltage of each grayscale, and driving the display device using the corrected optimal common voltage.

2. The display device driving method according to claim 1, wherein before the step of determining whether the other grayscales are shift based on the optimal common voltages of the other grayscales and the standard value corresponding to each grayscale, the display device driving method further comprises following steps:

obtaining the actual forward driving voltage and the actual reverse driving voltage for each grayscale; and determining the standard value corresponding to each grayscale based on the actual forward driving voltage and the actual reverse driving voltage of each grayscale.

3. The display device driving method according to claim 2, wherein the step of determining whether the other grayscales are shift according to the optimal common voltages of the other grayscales and the standard value corresponding to each grayscale comprises:

comparing the optimal common voltages of the other grayscales with the standard value corresponding to each grayscale, and determining a difference between the optimal common voltage of each grayscale and the standard value corresponding to each grayscale; and determining whether or not there is grayscale shift in the other grayscales based on the difference between the optimal common voltage of each grayscale and the standard value corresponding to each grayscale and a preset value.

4. The display device driving method according to claim 1, wherein the step of determining whether the other grayscales are shift according to the optimal common voltages of the other grayscales and the standard value corresponding to each grayscale comprises:

obtaining a maximum forward driving voltage of the standard grayscale;

determining the maximum forward driving voltages of the other grayscales according to the maximum forward driving voltage of the standard grayscale, the optimal common voltage of the standard grayscale, and the optimal common voltages of the other grayscales, and determining the maximum forward driving voltages of the other grayscales as the standard value corresponding to each grayscale; and determining whether the other grayscales have grayscale shift based on the standard value corresponding to the other grayscales and the actual forward driving voltage of the other grayscales.

5. The display device driving method according to claim 1, wherein the step of determining whether the other grayscales have grayscale shift according to the optimal common voltages of the other grayscales and the standard value corresponding to each grayscale comprises:

obtaining a maximum reverse driving voltage of the standard grayscale;

determining maximum reverse driving voltages of the other grayscales according to the maximum reverse driving voltage of the standard grayscale, the optimal common voltage of the standard grayscale, and the optimal common voltages of the other grayscales, and determining the maximum reverse driving voltages of the other grayscales as the standard value corresponding to each grayscale; and determining whether the other grayscales are shift based on the standard values corresponding to the other grayscales and the actual reverse driving voltages of the other grayscales.

6. The display device driving method according to claim 1, wherein the step of correcting the optimal common voltages of the other grayscales and driving the display device using the corrected optimal common voltages when the other grayscales have grayscale shift comprises:

determining critical grayscales of the other grayscales when there is grayscale shift;

correcting optimal common voltages of the critical grayscales, and correcting optimal common voltages of non-critical grayscales among other grayscales using the optimal common voltages after critical grayscale correction; and driving the display device using the corrected optimal common voltages.

7. The display device driving method according to claim 6, wherein the step of correcting the optimal common voltages of the critical grayscales and correcting the optimal common voltages of the non-critical grayscales among the other grayscales using the optimal common voltages after the critical grayscale correction comprises:

obtaining actual forward driving voltages and actual reverse driving voltages of the critical grayscales;

determining actual optimal common voltages of the critical grayscales according to the actual forward driving voltages and the actual reverse driving voltages of the critical grayscales; and correcting the optimal common voltages of the critical grayscales according to the actual optimal common voltages of the critical grayscales, and correcting the optimal common voltages of the non-critical grayscales among the other grayscales using the optimal common voltages after the critical grayscale correction.

8. The display device driving method according to claim 6, wherein the step of correcting the optimal common voltages of the critical grayscales and correcting the optimal common voltages of the non-critical grayscales among the other grayscales using the optimal common voltages after the critical grayscale correction comprises:

correcting optimal common voltages of the critical grayscales, and determining the optimal common voltages after the critical grayscale correction; and determining critical grayscales closest to the non-critical grayscales, and correcting the optimal common voltages of the non-critical grayscales using the optimal common voltage corrected for the closest critical grayscales.

9. The display device driving method according to claim 1, wherein the step of correcting the optimal common voltages of the other grayscales and driving the display device using the corrected optimal common voltage when the other grayscales have a grayscale shift further comprises:

determining a gamma voltage corresponding to each grayscale when correcting the optimal common voltages of the other grayscales; and correcting the gamma voltage of each voltage when the gamma voltage corresponding to each grayscale is different from a preset gamma voltage.

10. A display device, comprising:

an obtaining module configured to obtain an optimal common voltage of a standard grayscale of the display device;

a determining module configured to determine optimal common voltages of other grayscales according to the optimal common voltage of the standard grayscale;

a judging module configured to determine whether the other grayscales are shift according to the optimal common voltages of the other grayscales and a standard value corresponding to each grayscale; and a driving module configured to correct the optimal common voltages of the other grayscales when the other grayscales have grayscale shift, and drive the display device using the corrected optimal common voltages, wherein the driving module is further configured to determine an actual forward driving voltage and an actual reverse driving voltage of each grayscale when there is a grayscale shift in the other grayscales, determine an actual optimal common voltage of each grayscale according to the actual forward driving voltage and the actual reverse driving voltage of each grayscale, correct the optimal common voltage of each grayscale according to the actual optimal common voltage of each grayscale, and drive the display device using the corrected optimal common voltage.

11. The display device according to claim 10, wherein the display device further comprises a standard module configured to obtain the actual forward driving voltage and the actual reverse driving voltage of each grayscale, and determine the standard value corresponding to each grayscale based on the actual forward driving voltage and the actual reverse driving voltage of each grayscale.

12. The display device according to claim 11, wherein the judging module is specifically configured to determine a difference between an optimal common voltage of each grayscale and the standard value corresponding to each grayscale by comparing the optimal common voltages of the other grayscales with the standard value corresponding to each grayscale; whether or not there is a grayscale shift in the other grayscales is determined based on the difference between the optimal common voltage of each grayscale and the standard value corresponding to each grayscale and a preset value.

13. The display device according to claim 10, wherein the judging module is specifically configured to obtain a maximum forward driving voltage of the standard grayscale, determine maximum forward driving voltages of the other grayscales according to the maximum forward driving voltage of the standard grayscale, the optimal common voltage of the standard grayscale, and the optimal common voltages of the other grayscales, determine the maximum forward driving voltages of the other grayscales as the standard value corresponding to each grayscale, and determine whether the other grayscales have a grayscale shift based on the standard values corresponding to the other grayscales and the actual forward driving voltage of the other grayscales.

14. The display device according to claim 10, wherein the judging module is specifically configured to obtain a maximum reverse driving voltage of the standard grayscale, determine maximum reverse driving voltages of the other grayscales according to the maximum reverse driving voltage of the standard grayscale, the optimal common voltage of the standard grayscale, and the optimal common voltages of the other grayscales, determine the maximum reverse driving voltages of the other grayscales as the standard value corresponding to each grayscale, and determine whether the other grayscales are shift based on the standard values corresponding to the other grayscales and the actual reverse driving voltages of the other grayscales.

15. The display device according to claim 10, wherein the driving module is specifically configured to determine critical grayscales among the other grayscales when there is a grayscale shift, correct optimal common voltages of the critical grayscales, and correct optimal common voltages of non-critical grayscales among the other grayscales using the optimal common voltages after the critical grayscale correction, and drive the display device using the corrected optimal common voltages.

16. The display device according to claim 15, wherein the driving module is specifically configured to obtain actual forward driving voltages and actual reverse driving voltages of the critical grayscales, determine actual optimal common voltages of the critical grayscales according to the actual forward driving voltages and the actual reverse driving voltages of the critical grayscales; correct the optimal common voltages of the critical grayscales according to the actual optimal common voltages of the critical grayscales, and correct the optimal common voltages of the non-critical grayscales among the other grayscales using the optimal common voltages of the critical grayscale correction.

17. The display device according to claim 15, wherein the driving module is specifically configured to correct the optimal common voltages of the critical grayscales and determine the optimal common voltages after the critical grayscale correction, determine critical grayscales closest to the non-critical grayscales, and correct the optimal common voltages of the non-critical grayscales using the corrected optimal common voltages for the closest critical grayscales.

18. The display device according to claim 10, wherein the driving module is specifically configured to determine a gamma voltage corresponding to each grayscale when correcting the optimal common voltages of the other grayscales, and correct the gamma voltage of each grayscale when the gamma voltage corresponding to each grayscale is different from a preset gamma voltage.

* * * * *